(12) United States Patent
Mikan et al.

(10) Patent No.: US 8,477,920 B2
(45) Date of Patent: Jul. 2, 2013

(54) SYSTEMS AND METHODS FOR MANAGING THE STATUS OF PARTICIPANTS OF A TELE-NETWORKING MEETING

(75) Inventors: Jeffrey Mikan, Atlanta, GA (US);
Justin McNamara, Atlanta, GA (US);
John Lewis, Lawrenceville, GA (US);
Fulvio Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 891 days.

(21) Appl. No.: 12/568,389

(22) Filed: Sep. 28, 2009

(65) Prior Publication Data
US 2011/0075820 A1 Mar. 31, 2011

(51) Int. Cl.
*H04M 3/42* (2006.01)

(52) U.S. Cl.
USPC ............................. 379/202.01; 379/207.02

(58) Field of Classification Search
USPC ........................ 379/202.01–207.02
See application file for complete search history.

(56) References Cited

U.S. PATENT DOCUMENTS

| 5,483,588 A * | 1/1996 | Eaton et al. ............... 379/202.01 |
| 6,839,417 B2 * | 1/2005 | Weisman et al. ........ 379/204.01 |
| 7,317,791 B2 * | 1/2008 | Carlson .................... 379/202.01 |
| 7,319,745 B1 * | 1/2008 | Firestone ................ 379/202.01 |
| 8,175,242 B2 * | 5/2012 | Firestone ................ 379/202.01 |

* cited by examiner

*Primary Examiner* — Simon Sing
(74) *Attorney, Agent, or Firm* — Woodcock Washburn LLP

(57) ABSTRACT

Systems and methods for managing the status of participants of a tele-networking meeting are disclosed. During a tele-networking meeting, a network device may monitor the talk time of each participant of the meeting. If a participant's talk time exceeds the target talk time, the network device may prompt the chair, and the chair may take action. Action may include managing a participants status by muting, disconnecting, or spinning the participant off into a subconference. Additionally, during a tele-networking meeting, a chair may also create a subconference on network device. Thus, the chair may be able to spin off participants of a tele-networking meeting into a subconference controlled by a subchair.

20 Claims, 7 Drawing Sheets

SYSTEMS AND METHODS FOR MANAGING THE STATUS OF PARTICIPANTS OF A TELE-NETWORKING MEETING

TECHNICAL FIELD

The present invention relates generally to the field of telecommunications and specifically to managing the status of participants of a tele-networking meeting.

BACKGROUND

Because communications technology has become more advanced and less expensive, and because traveling to meetings has become more expensive and, at times, more risky, meetings are often held long distance in the form of conference calls, video conferences, web-based conferences, and one-on-one telephone calls. These types of meetings will be referred to herein as tele-networking meetings.

For various reasons, not all tele-networking meetings are as productive as they could be. For example, without face-to-face communications, the ability to hold side-bar conversations between two or more participants is limited or not available. Additionally, the ability to caucus in smaller sub-groups of participants is not available. It may be that certain participants are invited to participate but really do not need to be part of the tele-networking meeting, while others need to participate in a listen-only mode. There is no ability to regulate the amount of talk time for participants, either individually or collectively, in order to remain on schedule. Finally, with the increasing availability and use of technology in the workplace and at home, people are more likely to be working on two or more tasks at the same time, often referred to as "multitasking." Meeting attendees often multitask while participating in a tele-working meeting, thereby potentially reducing the overall productivity of the meeting, or conversely, if a portion of the meeting is not relevant to one or more participants, then those participants may want to multi-task during those non-relevant portions.

SUMMARY

Systems and methods are provided herein for managing the status of participants of a tele-networking meeting. Tele-networking meetings are telecommunications between two or more persons and may include three-way calls, conference calls, video teleconferences, web-based conferences, one-to-one telephone calls, and any other method of voice communications. To manage the status of participants of a tele-networking meeting, a tele-networking meeting is set up through a network device. Participants of the tele-networking meeting connect to the meeting through a network and a conference component. Additionally, a chair is designated to manage the status of the participants via a managing component. For example, if the tele-networking meeting is a conference call, participants of the conference call may dial in through a network to the network device and are connected with other participants on the call via the conference component. Additionally, a chair is designated to manage the status of the participants, during a conference call, and may select among statuses including, but not limited to, active, mute, standby, listen only status, subconference, or disconnected.

In one exemplary embodiment, the network device monitors the talk time of each participant of the tele-networking meeting and compares it with a target talk time. If the participant talk time is greater than the target talk time, then the chair is prompted and may take action to change the status of the offending participant. For example, during a conference call, if a participant exceeds a target talk time of fifteen minutes, the chair may be prompted, and the chair may change the participants status from active to mute or listen only status.

In another exemplary embodiment, the chair has the ability to set up a subconference on the network device and move participants of a tele-networking meeting into the subconference. For example, if during a conference call two participants begin discussing off-topic issues, the chair might choose to change the participants' status to side bar, thereby, moving them into a subconference.

These and other features and advantages of various exemplary embodiments of systems and methods according to this disclosure are described in, or are apparent from, the following detailed description of various exemplary embodiments of the systems and methods of this subject matter.

BRIEF DESCRIPTION OF THE DRAWINGS

The foregoing summary, as well as the following detailed description of illustrative embodiments, is better understood when read in conjunction with the appended drawings. For purposes of illustrating the invention, there is show in the drawings example constructions of the invention; however, the invention is not limited to the specific methods and instrumentalities disclosed. Various exemplary embodiments of this invention will be described in detail, with reference to the following figures, wherein like numerals represent like elements, and wherein.

DETAILED DESCRIPTION OF ILLUSTRATIVE EMBODIMENTS

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In the discussion that follows, details relating to telephony devices and networks are assumed to be known to those skilled in the art. Accordingly, such details are largely omitted herein for the sake of clarity and explanation. In addition, any references herein to an example embodiment involving a cellular, wireless, or mobile telephone are used solely for purposes of explanation, and are not intended to limit the invention to any such embodiment. For example, a wireless device as contemplated by various embodiments of the invention may include, but is not limited to: cellular telephones, personal digital assistants (PDAs), email devices, portable and non-portable computers, and the like. The wireless device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA, and other standards now known or to be developed in the future.

Figure 1:
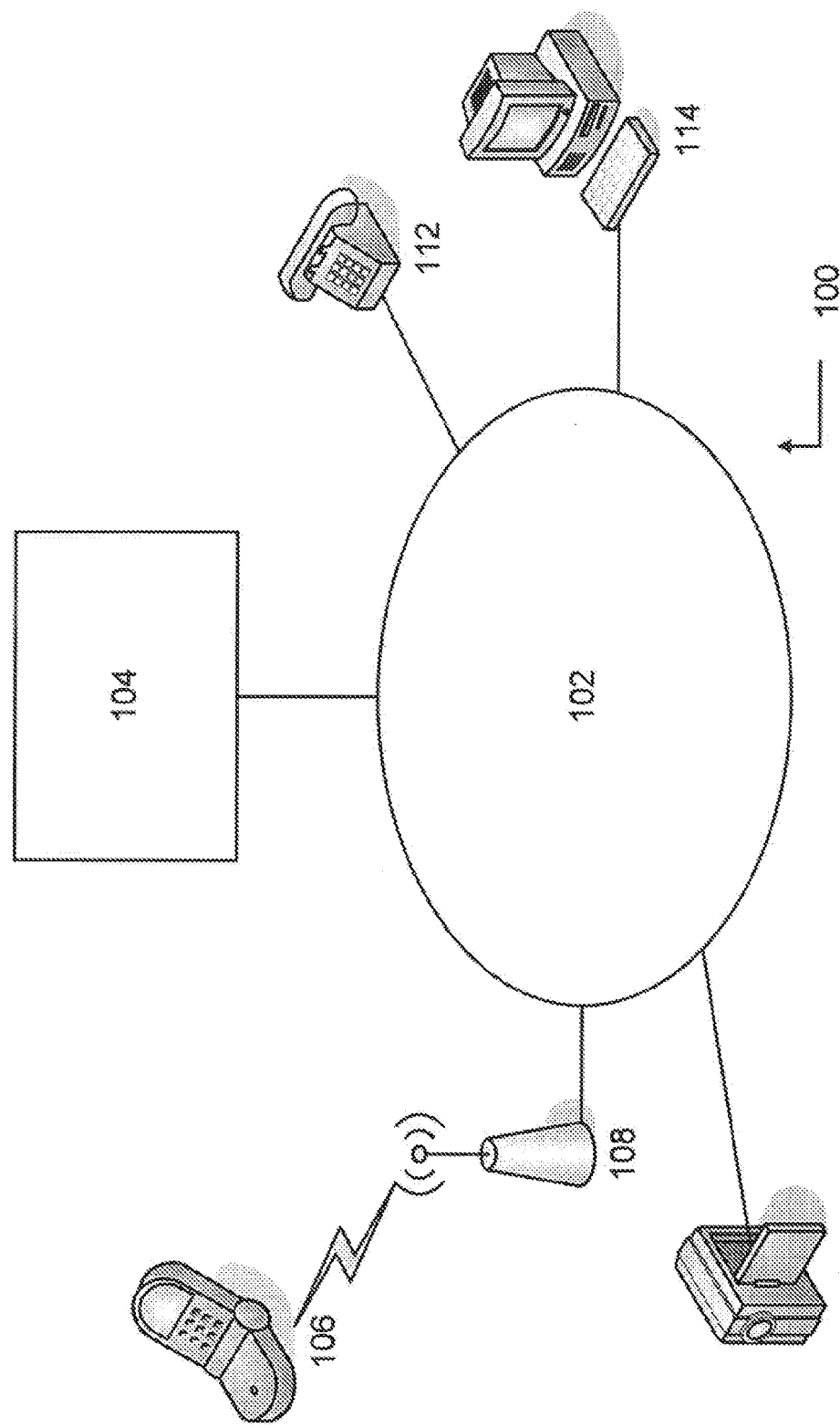
FIG. 1 is a block diagram of a non-limiting, exemplary tele-networking system including communications devices, a network, and users.

Modern communications devices allow people to communicate with one another through many different channels. Standard telephones, work telephones, mobile telephones and other mobile devices, and the various types of computers and computing devices provide a user with a plethora of communications options. With the increasing use of such devices and increasing cost and risk of traveling, people are using tele-networking meetings more frequently in order to communicate with a person or a number of people scattered in different locations. However, this can lead to ineffective and time consuming tele-networking meetings when, for example, not everyone is able to participate or participants start discussing off-topic issues FIG. 1 illustrates a tele-networking system 100 including communications devices, a network, and a network device that may be in use during a tele-networking meeting. A user may be participating in a tele-networking meeting with other users utilizing devices 106, 110, 112, or 114. The tele-networking meeting may include a three-way call, conference call, video teleconference, web-based conferences, one-to-one telephone calls or any other form of voice communications. It is contemplated that any other number of users, including one user may be participating in a telephonic communication with any other users and/or devices. For example, a user may be communicating with an automated system rather than one or more other users.

A user may be operating mobile communications device 106 as a means to participate in the tele-networking meeting. Mobile communications device 106 may be any type of mobile communications device as described herein, or any device capable of wirelessly facilitating tele-networking meetings. For example, mobile communications device 106 may be a mobile, wireless, and/or cellular telephone of any type, a personal data assistant (PDA), a laptop or other mobile computer, or any other mobile telephony capable device.

Similarly, a user may be operating wired communications device 112 as a means to participate in the tele-networking event. Wired communications device 112 may be any type of wired communications device as described herein, or any device capable of facilitating tele-networking meetings including a traditional telephone, an internet protocol (IP) telephone, a digital telephone, a computer of any type configured to facilitate tele-networking meetings, or any other wired telephony-capable device.

Additionally, a user may also utilize computing device 114 as a means to participate in the tele-networking meeting. Computing device 114 may be any type of computing device configured to facilitate tele-networking meetings including a desktop computer, a laptop computer, a net book, or any other computing device, wired or wireless, telephony-capable device.

A user may also use video teleconferencing device 110 as a means to participate in the tele-networking meeting. Generally, video teleconferencing systems comprise video input, video output, audio input, audio output, and data transfer. Video teleconferencing device 110 may be any video teleconferencing device capable of facilitating tele-networking meetings, including a dedicated video teleconferencing system, a desktop add-on video teleconferencing system, or any other video teleconferencing device capable of telephony functions. Additionally, a desktop add-on video teleconferencing system may be any hardware or software added to a normal desktop or laptop computing device configuring it to perform video teleconferencing functions.

Users, through the operation of devices 106, 110, 112 and/or 114, may be communicating through network 102. In the case of mobile communications device 106, a user may be routed from a network tower 108 to network 102. Network 102 may be one or more wired and/or wireless network(s) of any type, non-limiting examples of which are described herein, or any combinations thereof. Network 102 may be a cellular network, Internet network, Public Switch Telephone Network and/or the like. Any form of telecommunications, voice, or data network, or any combination of such networks, may also be present in network 102.

Network device 104 may be communicatively connected to network 102, may be a subsystem of network 102, and may be operated, owned, and/or maintained by the operator of network 102 or a third party. Network 102 may or may not be geographically located at the same location as other devices that comprise network 102. Network device 104 may facilitate communication between users' of devices 106, 110, 112, and/or 114. Additionally, network device 104 may also provide telephony services as known to those skilled in the art. Network device 104 may include a server, a computer, a switch, a private branch exchange (PBX), and/or any device configured to facilitate communication between one or more persons. In one embodiment, network device 104 may be configured to manage the status of participants of a tele-networking meeting as described herein.

As will be discussed in greater detail below, in one embodiment, network device 104 may be configured to measure the talking time of each participant and compare the talking time of each participant with a set target talk time. Additionally, network device 104 may also be configured to send a signal to a participant based on whether the participant talking time exceeded or failed to reach the set target talk time.

In another embodiment, network device 104 may be configured to create a second tele-networking meeting wherein entry by participants from the first tele-networking is enabled.

Figure 2:
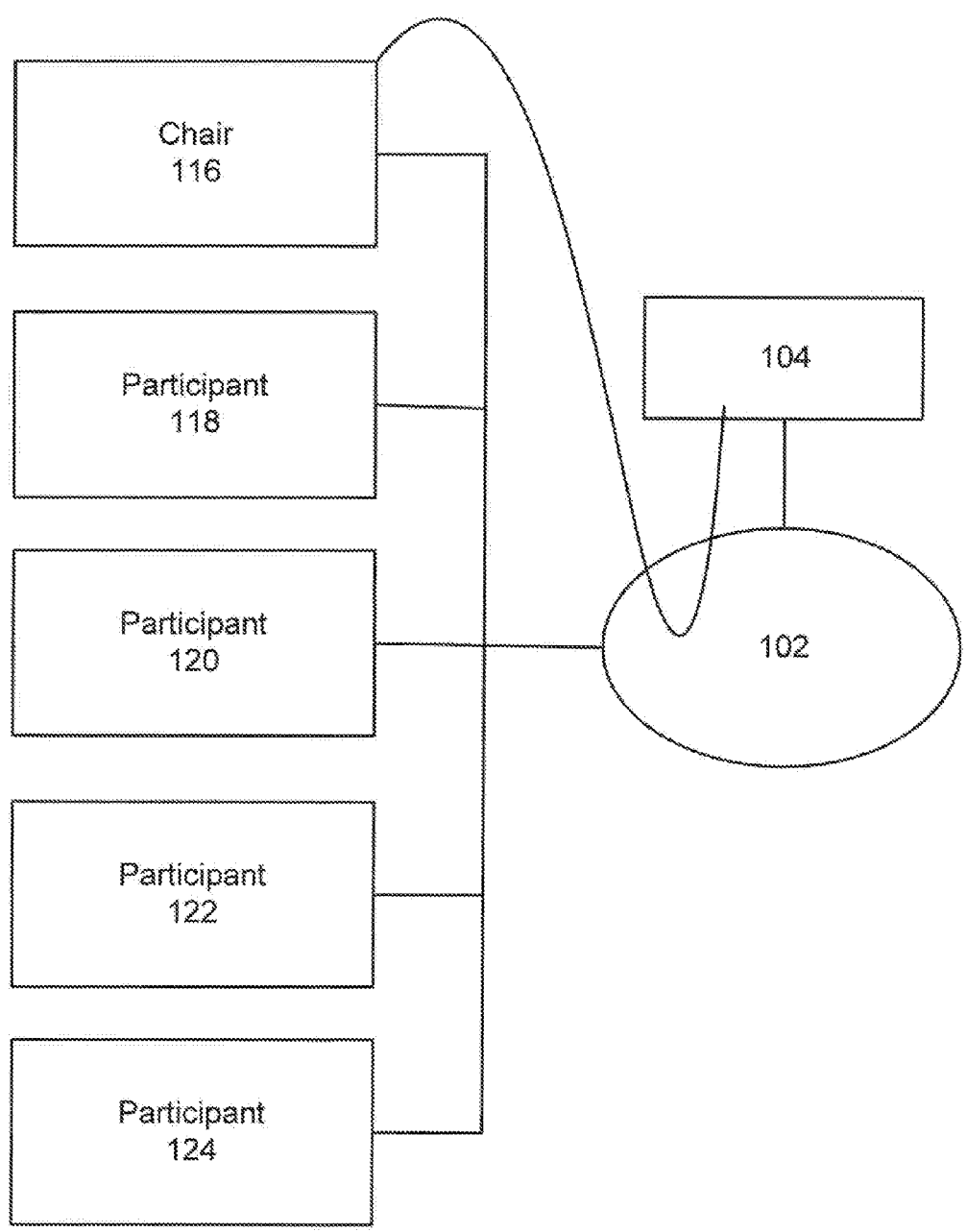
FIG. 2 is a block diagram of a non-limiting, exemplary hierarchy for participation in a tele-networking meeting using the tele-networking system of FIG. 1.

FIG. 2 illustrates a non-limiting, exemplary hierarchy for participation in a tele-networking meeting using the tele-networking system of FIG. 1. In FIG. 2, through network 102, chair 116 is connected to network device 104. Chair 116 may include a tele-networking meeting moderator, organizer, manager, operator, administrator, device configured to manage the tele-networking meeting, any other person or device designated to manage the status of the participants of a tele-networking meeting, or any combination thereof.

In one embodiment, chair 116 has control over network device 104 through network 102. Thus, chair 116 may utilize network device 104 to manage the status of participants 118, 120, 122, and 124.

Additionally, chair 116 and participants 118, 120, 122, and 124 are also connected to one another and to network device 104 through network 102. As discussed earlier, network 102 may be a cellular network, Internet network, Public Switch Telephone Network and/or the like. In one embodiment, chair 116 and participants 118, 120, 122, and 124 are connected to network device 104 and each other through the same network 102. For example, if participants 118, 120, 122, and 124 and chair 116 all participate in a tele-networking meeting using a cellular device, then they may all be connected to network device 104 and each other through a cellular network.

In an alternate embodiment, chair 116 and participants 118, 120, 122, and 124 may be connected to each other and network device 104 through separate networks. For example, chair 116, participant 118, and participant 120 may be participating in a tele-networking meeting via cellular devices; thus, they would be connected to network device 104, each other, and to participants 122 and 124 through a cellular network. Additionally, participants 122 and 124 may be participating in the tele-networking meeting via a traditional land-line telephone; therefore, participant 122 and 124 would be connected to each other, network device 104, chair 116, and participants 118 and 120 through a public switch telephone network.

Figure 3:
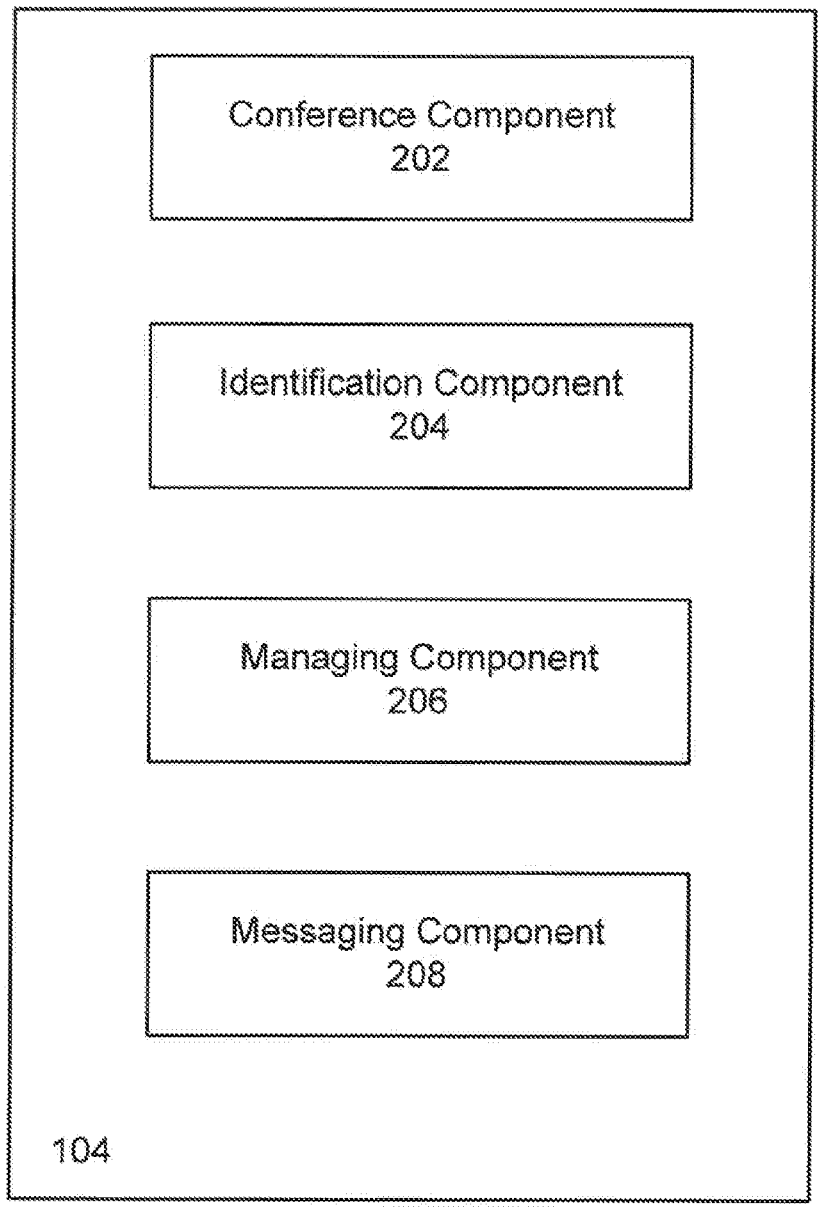
FIG. 3 is a block diagram of a non-limiting, exemplary system for managing the status of participants of a tele-networking meeting.

FIG. 3 illustrates a block diagram of a non-limiting, exemplary system for managing the status of participants of a tele-networking meeting, system 200. In one exemplary embodiment, the components of system 200 may be found located in a single location, as illustrated in FIG. 3. However, in an alternative embodiment, each component of system 200 may also be located in a different location.

In system 200, conference component 202 connects participants of a tele-networking meeting in a tele-networking meeting. Once connected to a tele-networking meeting, the identification component 204 identifies each participant of the tele-networking meeting. The identification component 204 may identify each participant by name, phone number, a user name, IP address, or any other means of identifying each participant of the tele-networking meeting. Thus, the identification component 204 may be able to associate each participant with his or her input line. For example, if Joe, a participant of a conference call, dials in to join a conference call, he may be required to enter his name or other identifier. The identification component 204, then, may associate Joe with the phone number used to dial into the conference call. As a result, identification component 204 may identify each individual participant of a tele-networking meeting so that other components, as will be discussed later, may be able to track activity of each participant.

System 200 also comprises of a managing component 206. Managing component 206 allows chair 116 to control and manage the status of each participant of a tele-networking meeting. Each participant may be assigned one or a plurality of statuses. The statuses may include, but are not limited to, active, mute, unmute, standby, listen only, subconference, disconnect, or any other term representative of or used to denote a participant's status or level of participation in a tele-networking meeting.

Additionally, system 200 also comprises a messaging component 208 that allows system 200 to both send and receive messages to and from any participant of tele-networking meeting.

Figure 4:
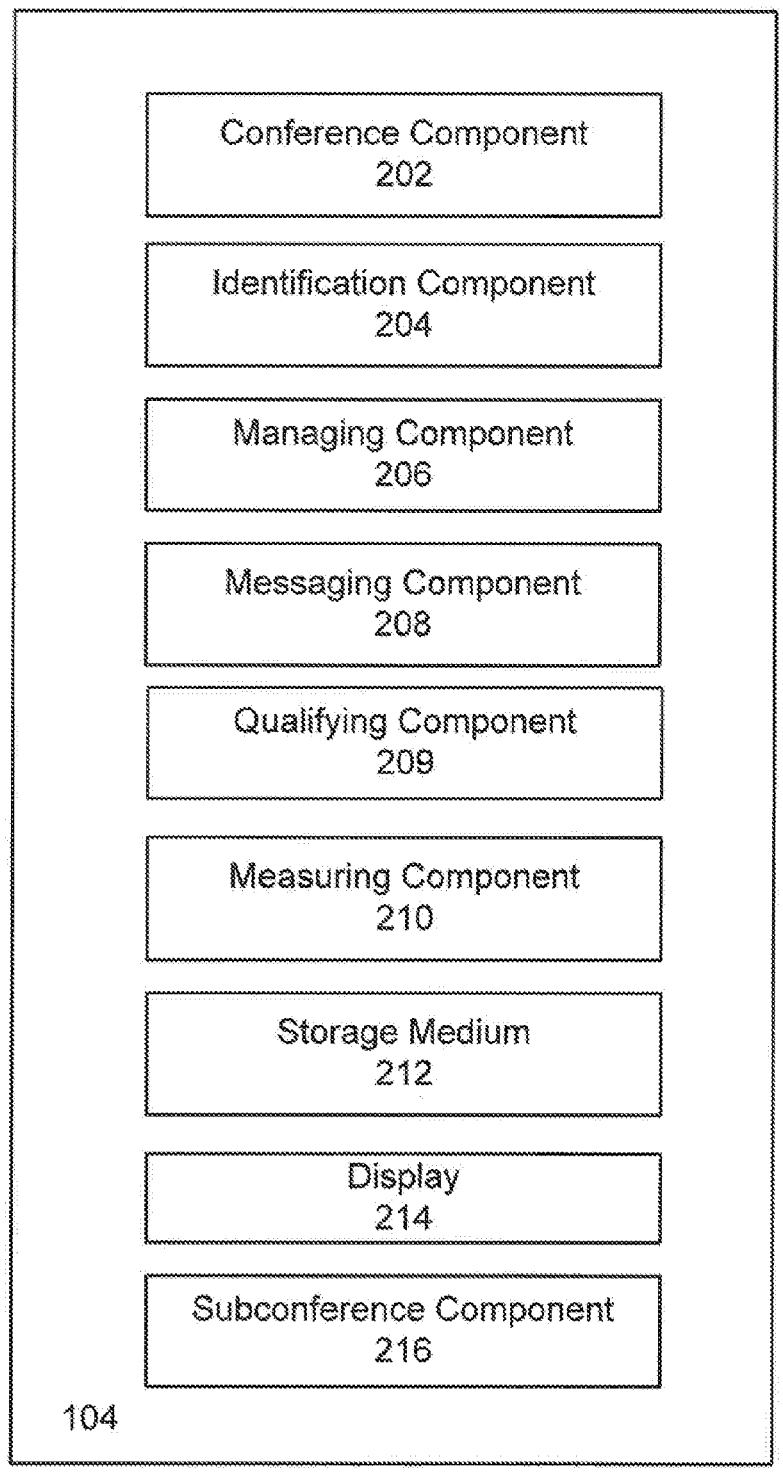
FIG. 4 is a block diagram of an alternate, non-limiting, exemplary system for managing the status of participants of a tele-networking meeting.

FIG. 4 illustrates a block diagram of an alternative non-limiting, exemplary method of managing the status of participants of a tele-networking meeting. In FIG. 4, in addition to the conference component 202, identification component 204, managing component 206, and messaging component 208, system 200 also comprises a qualifying component 209, measuring component 210, storage medium 212, display 214, and subconference component 216. As with FIG. 3, in an exemplary embodiment, the components of FIG. 4 are illustrated as all being in a single location, within network device 104. However, in an alternate embodiment, the components in FIG. 4 may all be located in different locations.

The qualifying component 209 in FIG. 4 is configured to authenticate participants of a tele-networking meeting. The qualifying component 209 verifies that each participant has been invited to the tele-networking meeting. Additionally, the qualifying component 209 may also authenticate chair 116, verifying that chair 116 has control to manage the status of the participants of the tele-networking meeting.

FIG. 4 also contains a measuring component 210 that is configured to measure the talk time of each participant of a tele-networking meeting. In one embodiment, after the identification component identifies each participant of a conference call, the measuring component is able to measure the talk time of each participant. It is contemplated that measuring component 210 may measure other features in addition to the talk time of each participant, including how long a participant has been on mute, the time participants have spent in a subconference, the time participants have spent looking at other applications on a computing device, or any other measurable feature. Additionally, in another embodiment, the measuring component 210 may also be configured to compare the measured talk time of each participant and compare it with a target talk time. In an alternate embodiment, measuring component 210 measures the cumulative talk time of each participant over a plurality of related tele-networking meetings and compares the cumulative talk time to the target talk time. Measuring component 210 may measure the talk time of all participants or only measure the talk time of selected individuals.

FIG. 4 also comprises a storage medium 212. Storage medium 212 is configured to store data. In one embodiment, storage medium 212 may be configured to store the talk time of each participant measured by the measuring component 206. Additionally, storage medium 212 may also store the identification of each participant of a tele-networking meeting, recordings of each teleconference, other measurable features, and/or the like.

In FIG. 4, system 200 also comprises display 214 to show the identification of each participant. Additionally, display 214 may also display the status of the participants of a tele-networking meeting. For example, display 214 may display that the participant on Line 1 is Joe and his status is active. Additionally, display 214 may show Line 2 is Jennifer and her status is mute. Additionally, display 214 may also show the measured talk time or other measured statistic of each individual participant. For example, display 214 may reveal that Joe on Line 1 has talked for 9 minutes. In one embodiment, display 214 is only viewed by chair 116. However, in an alternate embodiment, display 214 may be viewed by one or more participants of a tele-networking meeting.

Additionally, as will be discussed further below, in FIG. 4, system 200 further comprises a subconference component 216. The subconference component 216 is configured to allow chair 116 to assign or transfer participants of a tele-networking meeting into a second tele-networking meeting, hereinafter referred to as a subconference. In one embodiment, the subconference component 216 is configured to set up a subconference. The subconference component 216 may then transfer participants of the first tele-networking meeting into the subconference. In another embodiment, the subconference component 216 is configured to set up a subconference, allow participants of the first tele-networking meeting to dial in to the subconference, and qualify participants for the subconference. In another embodiment, subconference component 216 comprises all of the same features and can perform all of the same functions as system 200.

In one non-limiting, exemplary method of managing the status of participants of a tele-networking meeting using the system of FIG. 4, chair 116 may decide to alter a participant's status using managing component 206. Prior to or simultaneous to altering a participant's status, chair 116 may send the participant a notification through messaging component 208. The notification may be sent via any method capable of notifying a participant of the impending status change including text, SMS, e-mail, displays, voice, or any other method of notification. In an alternate embodiment, chair 116 may not provide any notification to a participant; instead, chair 116 may simply alter the participant's status. Subsequently, chair 116 may change the status of a participant during the course of the tele-networking meeting.

Additionally, it is contemplated by the inventors that chair 116 may modify the status of a participant at any time before or during the tele-networking meeting. For example, during a conference call, if a particular participant is not needed for a portion of the call, the chair may notify the participant, stating that the participant is not needed for the next twenty minutes, and alter the participant's status from active to standby or listen only. Once the conference call reaches a point where the participant is needed again, the chair may send a notification to the participant requesting the participant join the conference call or alter the participants status from standby or listen only to active. Such notification could be through the telecommunications network or be based upon some pre-arranged notification method. As an additional example, if a participant is not needed for the first half of a conference call, the participant may go about his usual business until he receives a notification to join the conference call.

Figure 5:
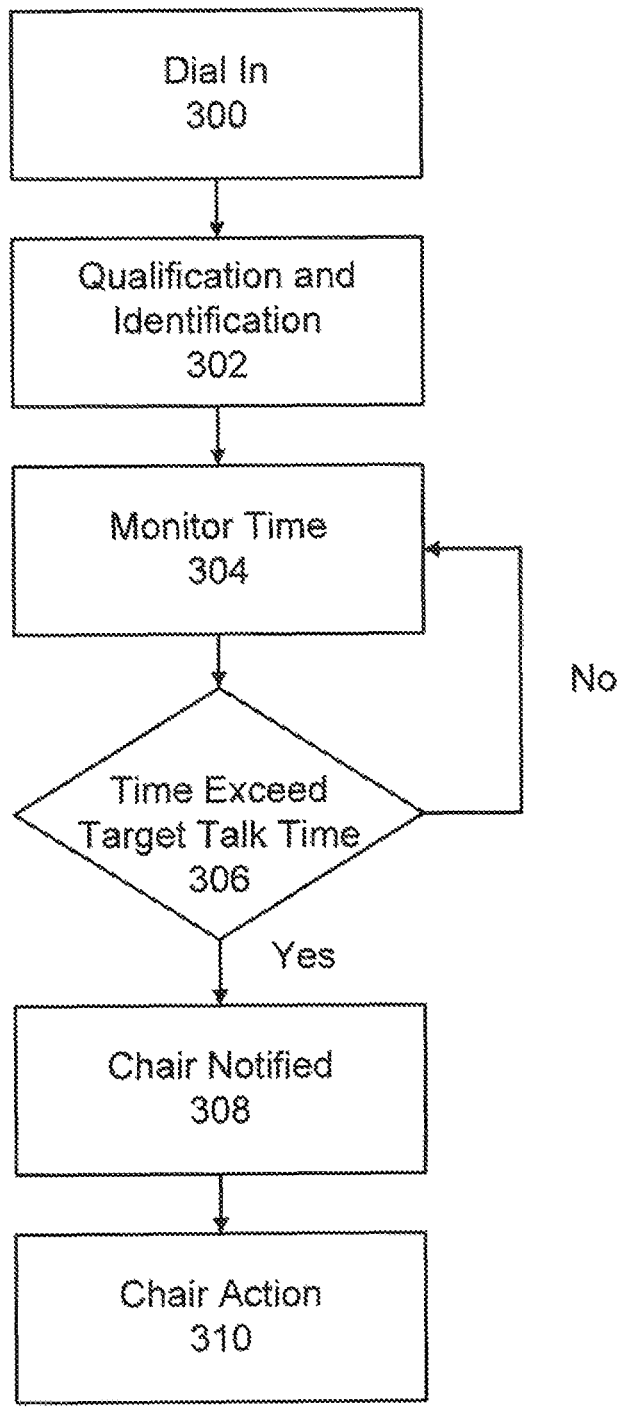
FIG. 5 is a flow chart of a non-limiting, exemplary method of using the tele-networking system of FIG. 1 and FIG. 4.

FIG. 5 illustrates a flow chart of a non-limiting, exemplary method of managing the status of participants of a tele-networking meeting using the tele-networking system of FIG. 1 and the system of FIG. 4. Once a tele-networking meeting has been set-up, at step 300, the participants of a tele-networking meeting dial into the meeting. In one embodiment, as discussed above, the participants may dial into the tele-networking meeting using mobile communications device 106 connecting to network device 104 through network 102. Dialing in to a tele-networking meeting may include pressing numbers on a telephone keypad, typing tele-networking meeting information into a computing device, speaking information into a speaker, or any other method that allows a participant to access network device 104.

At step 302, qualifying component 209 of network device 104 qualifies each participant for the tele-networking meeting. If a participant fails to qualify, qualifying component 209 may request the participant to re-enter tele-networking meeting information or prohibit participant from accessing the tele-networking meeting. At step 302, each participant is also identified by the identification component 204. The identification component 204 is configured to identify each participant of the tele-networking meeting. The identification component 204 may identify each participant by name, phone number, a user name, IP address, or any other means of identifying each participant of the tele-networking meeting. Thus, the identification component 204 may be able to associate each participant with his or her input line.

Once qualified and identified, at step 304, measuring component 210 is configured to monitor the amount of time each participant talks during the tele-networking meeting, or hereinafter participant talk time. Measuring component 210, then, compares the participant talk time with a target talk time. A target talk time is the amount of time chair 116 decides to let each participant talk for in a tele-networking meeting, over the course of a plurality of related tele-networking meetings, or over a plurality of tele-networking meetings. In one embodiment, the target talk time is pre-set by chair 116 prior to the tele-networking meeting. For example, when setting up a conference call, the conference call organizer may decide that each participant should talk for no more than fifteen minutes, thus, the organizer would set a target talk-time of fifteen minutes prior to the conference call.

In another embodiment, the target talk-time may be set at any point during the tele-networking meeting. For example, the organizer sets up a conference call without a target talk time; however, during the conference call, one participant begins talking too much. The organizer may, during the conference call, set a target talk time of fifteen minutes.

In yet another embodiment, a target talk time may not even be set. Measuring component 210 may simply monitor the amount of time each participant talks during a tele-networking meeting and communicate this information to chair 116.

In yet another embodiment, the target talk time may not be uniform for every participant on the tele-networking meeting. Instead, measuring component 210 may be configured so that each participant has a different target talk time, or even no target talk time at all. For example, if in a given conference one person is expected to talk more than the others during a given conference call, s/he may not have a target talk time or have a higher target talk time than other participants of the call.

Additionally, at step 304, the measured participant talk time and the target talk time may be stored in storage medium 212.

At step 306, a decision is made regarding whether or not the participant talk time exceeded the target talk time. If the participant talk time fails to exceed the target talk time, then measuring component 210 continues to monitor the talk time of each participant at step 304. On the other hand, if the participant talk time exceeds the target talk time, at step 308, chair 116 is notified by messaging component 208. At step 308, notifying chair 116 includes using text, SMS, e-mail, displays, sound, or any other manner to notify chair 116 that the participant talk time has exceeded the target talk time. Continuing the example above, if the target talk time for a conference call is set at fifteen minutes and during the course of the conference call participant "A" exceeds the target talk time, the organizer may receive an e-mail notifying the organizer that participant has exceeded the target talk time.

In an alternate embodiment, at step 308, messaging component 208 may notify chair 116 and/or other participants of the tele-networking meeting that a participant has exceeded the target talk time.

In an yet another embodiment, messaging component 208 may not send out a notification, thus, skipping step 308. Instead, managing component 206 may be configured to automatically manage the status of the participant including automatically muting, disconnecting, moving participant into a subconference, or allowing participant to continue talking once the participant talk time exceeds the target talk time.

At step 310, chair 116 may use managing component 206 to take action against participants that exceed the target talk time. Action may include altering the status of a participant of a tele-networking meeting and may include muting the participant who exceeded the target talk time, disconnecting the participant, moving the participant into a subconference, allowing the participant to keep talking, or the like.

In another embodiment, where at step 308 chair 116 and/or other participants of the tele-networking meeting are notified, chair 116 and/or other participants of the tele-networking meeting, then at step 310, may take action collectively. The participants and chair 116 may enter a vote to decide whether to allow a participant who has exceeded the target talk time to continue talking Participants and chair 30 may enter a vote using Dual Tone Multi-frequency signaling ("DTMF"), SIP messaging, instant messaging, text, e-mail, or any other method of conveying a tele-networking meeting participant's choice. For example, if participant A's talk time exceeds the target talk time of fifteen minutes, each participant on the conference call may receive a notification from messaging component 208. The participants of the call could then enter #1 on their phones to allow participant A to continue talking, or #2 to mute participant A. The participants' selections would be transmitted to the organizer who could then take action based on the participants' selection. Alternatively, chair 116 could designate another participant in charge of taking action against the exceeding participant.

In yet another embodiment, as discussed above, managing component 206 may be configured to automatically take action against a participant who's talk time exceeds the target talk time, thus, eliminating the need of prompting chair 116 or chair 116 taking action.

Although the description of FIG. 5 focuses on the method being performed during the course of a single tele-networking meeting, it is contemplated by the inventors that the exemplary method in FIG. 5 may be applied to a plurality of tele-networking meetings as well. In one embodiment, measuring component 210 may be configured to monitor participant talk time over a plurality of meetings. After each tele-networking meeting of the plurality of tele-networking meetings, measuring component 210 stores the participant talk time associated with each participant on storage medium 212. At a subsequent tele-networking meeting, when the participant is qualified and identified, the measuring component 210 recalls the previously stored participant talk time associated with each participant of the tele-networking meeting and continues to measure the participant talk time, comparing the participant talk time to a target talk time set up for the plurality of tele-networking meetings. Again, at any point if the participant talk time exceeds the target talk time for the plurality of tele-networking meetings, then chair 116 and/or participants of the tele-networking meeting, would be notified and allowed to manage the status of the participant using managing component 206.

Figure 6:
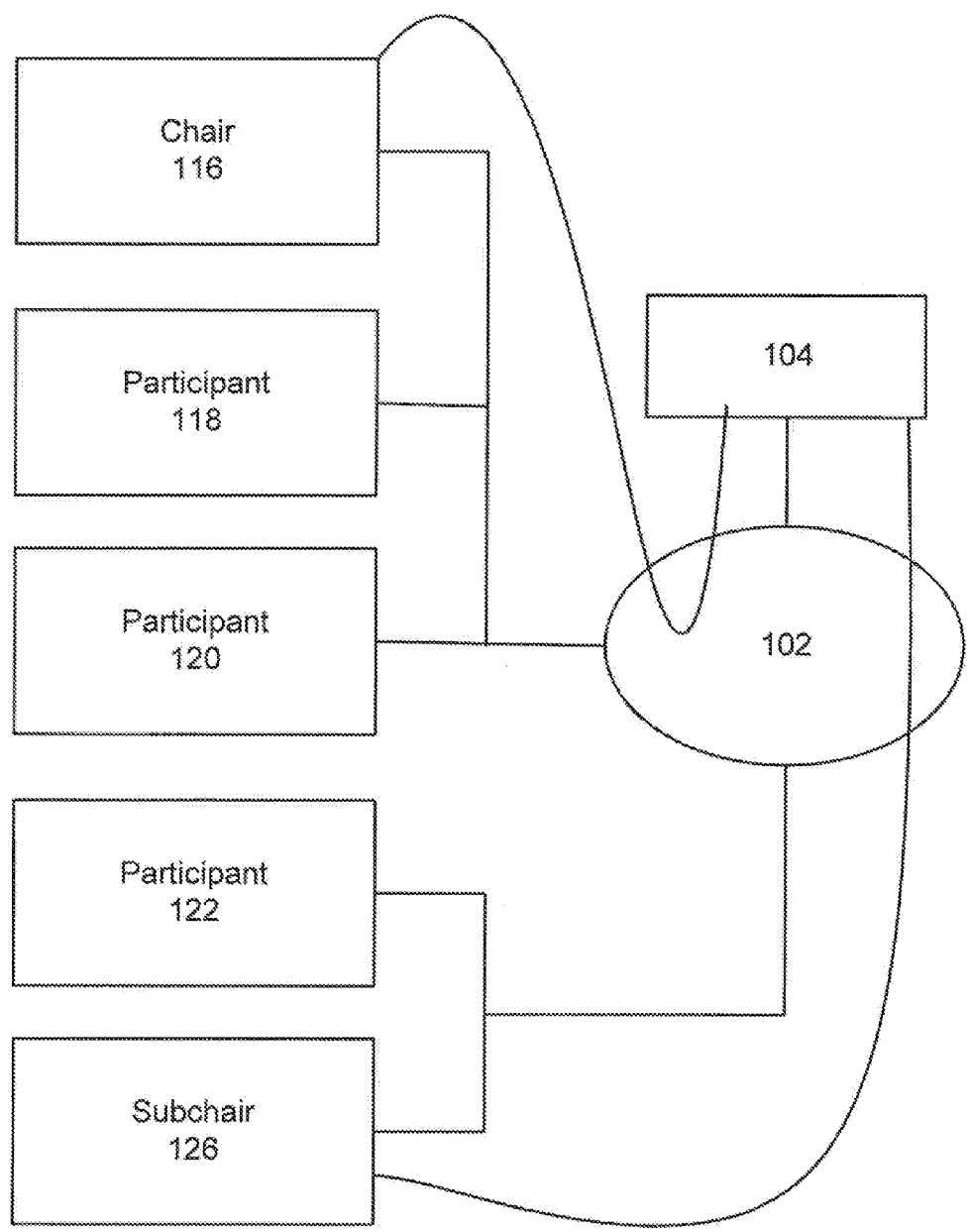
FIG. 6 is a block diagram of a non-limiting, exemplary hierarchy for participation in a tele-networking meeting using the tele-networking system of FIG. 1 and FIG. 4.

FIG. 6 illustrates a block diagram of a non-limiting, exemplary hierarchy for managing the status of participants in a tele-networking meeting using the tele-networking systems of FIG. 1. In FIG. 6, chair 116 and participants 118 and 120 are connected to each other and to network device 104 through network 102. Additionally, sub-chair 126 and participant 122 are also connected to each other and to network device 104 through network 102.

In FIG. 6, the status of subchair 126 and participant 122 has been changed from being on a main tele-networking meeting to being on a second tele-networking meeting, hereinafter referred to as a subconference. As will be discussed in detail below at FIG. 7, each participant of a tele-networking meeting may request a subconference. Upon receiving a request for a subconference, chair 116 may decide to change the status of the participants of the tele-networking meeting who desire to join the subconference. A subchair 126 is then created to oversee and manage the subconference. Similar to chair 116, subchair 126 may have control over managing the status of participants in the subconference. Additionally, subchair 126 may include a tele-networking meeting moderator, organizer, manager, device configured to oversee the tele-networking meeting, any other person or device designated to manage the status of the participants of a tele-networking meeting, or any combination thereof. Additionally, subchair 126 may be either a person, device, a plurality of persons, a plurality of devices, or any combination thereof.

Figure 7:
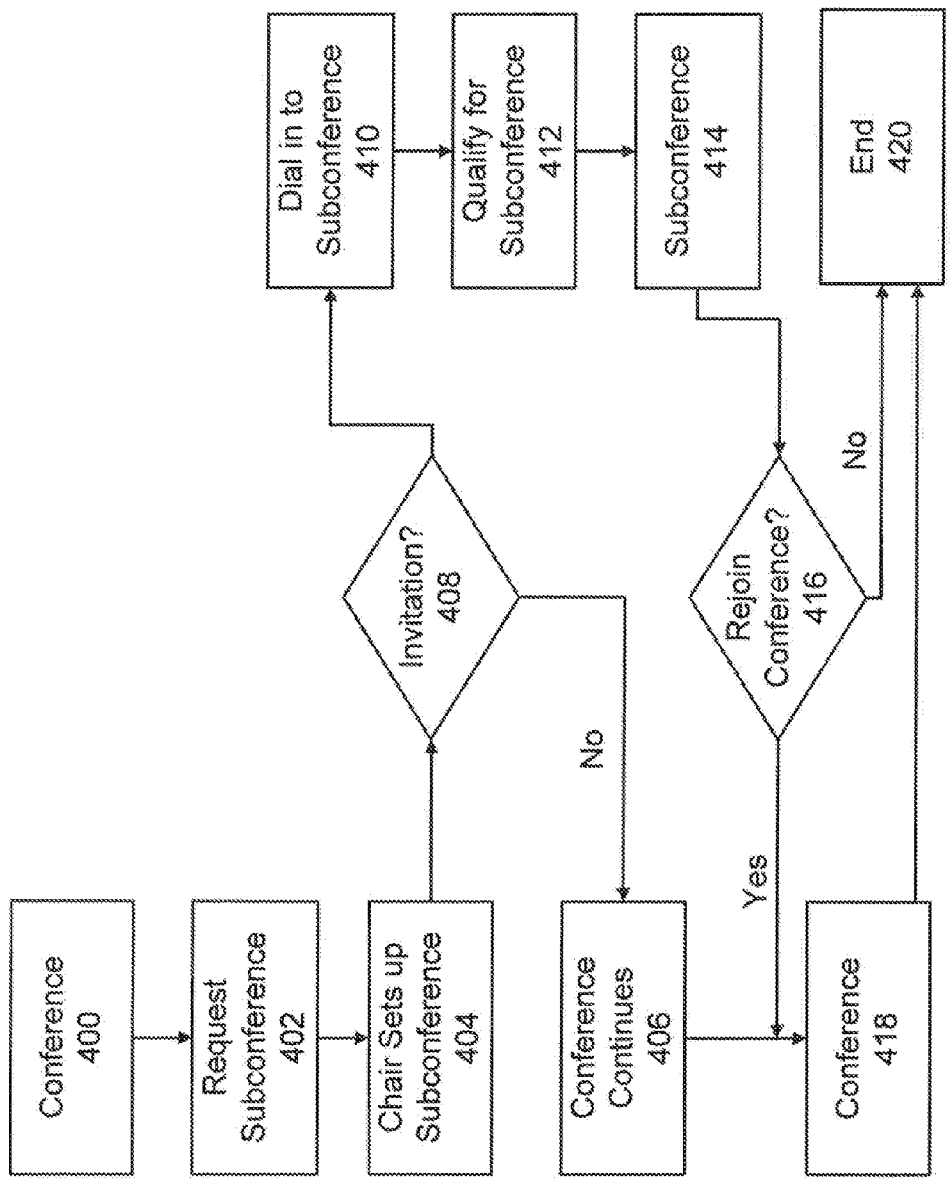
FIG. 7 is a flow chart of a non-limiting, exemplary method of using the tele-networking system of FIG. 1 and FIG. 4.

FIG. 7 illustrates a flow chart of a non-limiting, exemplary method of managing the status of participants of a tele-networking meeting using the systems of FIG. 1 and FIG. 4. Beginning at step 400, chair 116 and participants engage in a tele-networking meeting. During the meeting, participants or chair 116 may decide that a subconference is needed. For example, during a conference call, one or more participants may engage in a discussion concerning an important issue; however, the issue may be an off topic discussion. As an additional example, during a negotiation conference call, an attorney may want the opportunity to confer with his client separate from the other participants of call. As a result, at step 122, chair 116 or participants of a tele-networking meeting may request a subconference.

At step 402, participants of a tele-networking meeting may request a subconference through a method of communication including text, Short Message Service, DTMF signaling, e-mail, SIP messaging, phone call, or any other means configured to notify chair 116 a subconference is desired. For example, using the previous negotiation conference call example, an attorney could simply ask chair 116 during the call to set up a subconference. Alternatively, an attorney could send chair 116 a text or an e-mail requesting a subconference. In an alternate embodiment, chair 116 may independently decide that a subconference is necessary.

At step 404, chair 116 sets up a subconference using network device 104. Additionally, at step 404, chair 116 also designates a sub-chair to manage the subconference. In another embodiment, at step 404, chair 116 may also set up a plurality of subconferences.

After a subconference is created at step 404, an invitation is supplied to participants of the main tele-networking meeting at step 408. The invitation supplied at step 408 may include a password, log-in number, or any other method of assuring only designated participants of the tele-networking meeting may access the subconference. Alternatively, the invitation, at step 408, may not contain any restrictions or qualifying information necessary to allow a participant to join the subconference. In one embodiment, at step 408, an invitation is sent to all participants of the tele-networking meeting; therefore, any participant may join the subconference if s/he so choose. In an alternate embodiment, at step 408, an invitation is only sent to specific participants of the tele-networking meeting. For example, if at step 404, an attorney requests a subconference to discuss confidential matters with his/her client, then at step 408, an invitation to join a subconference may be sent only to the attorney and client and not other participants of the tele-networking meeting.

In another embodiment, chair 116 may not send an invitation to join the subconference. Instead, chair 116 may designate specific participants of the tele-networking meeting to join a subconference, and the designated participants may be automatically transferred into the subconference. For example, if during a negotiation conference call, chair 116 decides that the two negotiating parties need time to discuss the issues privately, chair 116 may set up two subconferences and change the status of both parties, so that they are now a part of two separate subconferences.

Additionally, at step 408, the recipients of invitations decide whether or not to join the subconference. If a participant of the tele-networking meeting declines the invitation to join the subconference, then that participant continues to participate in the tele-networking meeting, step 406. In another embodiment, if a invited participant takes no action with regards to the invitation, then the invited participant will remain on the tele-networking meeting and continue to step 406. Conversely, if a participant accepts the invitation to join a subconference at step 408, then the participant may dial into the subconference at step 410. It is contemplated that the participant access the subconference by means other than dialing into.

Qualifying component 209, at step 412, then qualifies the participants for the subconference. And at step 414, participants participate in the subconference with sub-chair 126 managing the status of the participants of the subconference. The statuses may include, but are not limited to, active, mute, standby, listen only status, subconference, or disconnected.

Additionally, at step 414, during the subconference, network device 104 is configured to perform the same functions as during the first tele-networking meeting. In one embodiment, network device 104 may mute a participant whose talk time exceeds a target talk time, as previously discussed. In another embodiment, network device 104 may record the conversation of the subconference. In another embodiment, network device 104, may allow users to mute their own connections.

At step 416, the participant of a subconference decides whether or not to rejoin the original tele-networking meeting. In one embodiment, participants of a subconference may choose to rejoin the tele-networking meeting at any time during the subconference. For example, if during a subconference call participant "A" decides it would be more beneficial for him/her to be contributing on the original tele-networking meeting, then participant "A" may rejoin the tele-networking meeting.

In an alternate embodiment, a subconference participant may only rejoin the tele-networking meeting upon the expiration of a set time limit. For example, during a negotiation conference call, chair 116 may create a subconference to allow the parties to discuss the issues in private. However, chair 116 may limit the individual subconferences to fifteen minutes in order to continue progressing further in negotiation. Thus, each party would be unable to rejoin the original tele-networking meeting prior to the expiration of the set time limit. In yet another embodiment, a subconference participant may rejoin the tele-networking meeting automatically upon the conclusion of the subconference.

If at step 416, participant decides not to rejoin the conference at step 416, then network device 104 disconnects the participant from the subconference and the tele-networking meeting and the conference ns at step 420. However, if the participant decides to rejoin the tele-networking meeting, then network device 104 reconnects him/her to the first tele-networking meeting.

At step 418, a participant of the subconference rejoins the conference. Thus, chair 116 may utilize managing component 206 to change the participant's status. At step 420, the tele-networking meeting ends.

While the tele-networking meeting participant status management systems and methods have been described in connection with the various embodiments of the various figures, it is to be understood that other similar embodiments can be used or modifications and additions can be made to the described embodiments for performing the same functions of a tele-networking meeting participant status management system without deviating from the described systems and methods. For example, one skilled in the art will recognize that a tele-networking meeting participant status management system as described in the present application may apply to any environment, whether wired or wireless, and may be applied to any number of such devices connected via a communications network and interacting across the network. Therefore, tele-networking meeting participant status management systems such as those described herein should not be limited to any single embodiment, but rather should be construed in breadth and scope in accordance with the appended claims.

What is claimed:

1. A system comprising:
    a measuring component configured to measure a talk time of each participant of a tele-networking meeting,
        wherein the measuring component is configured to compare the measured talk time of each participant with a target talk time for each participant, and
        wherein the measured talk time is cumulative over a plurality of tele-networking meetings; and,
    a messaging component configured to send or receive telecommunications based on the comparing of the measured talk time of each participant with the target talk time.

2. The system of claim 1, further comprising:
    a managing component configured to allow a manager to control a status of the participants of the tele-networking meeting, wherein the status of the participants of the tele-networking meeting is one of active, mute, standby, listen only, subconference, and disconnected.

3. The system of claim 1, wherein telecommunications is one of voice, text, SMS, tone, email, and data.

4. The system of claim 1 further comprising:
    a storage medium configured to store information related to the tele-networking meeting;
    a display configured to view a status of the participants of the tele-networking meeting; and
    a qualifying component for authenticating the participants of the tele-networking meeting.

5. The system of claim 4, wherein the storage medium is configured to store the target talk time and/or the measured talk time of each participant.

6. The system of claim 1, further comprising a subconference component configured to connect a subset of the participants of the tele-networking meeting in a second tele-networking meeting.

7. A method for managing status of participants of tele-networking meetings on a network device, comprising:
    measuring a talk time of each participant of a tele-networking meeting, wherein the measuring is cumulative over a plurality of tele-networking meetings;
    storing the measured talk time of each participant;
    comparing the measured talk time of each participant with a target talk time; and,
    sending a telecommunication to a participant of the tele-networking meeting based on the comparing of the measured talk time of each participant with the target talk time.

8. The method of claim 7, further comprising:
    controlling a status of the participants of the tele-networking meeting based on the comparing of the measured talk time of each participant with the target talk time, wherein the status of the participants of a tele-networking meeting is one of active, mute, standby, listen only, subconference, and disconnected.

9. The method of claim 7, wherein telecommunications includes one of voice, text, SMS, tone, email or data.

10. The method of claim 7, wherein the telecommunication is sent to a participant of the tele-networking meeting if a participant's talk time is greater than the target talk time.

11. The method of claim 7, wherein the telecommunication comprises instructions to create a subconference meeting facility.

12. The method of claim 11, further comprising:
qualifying participants for a second tele-networking meeting; and,
admitting participants to the second tele-networking meeting based on the qualifying step; wherein the participants in the second tele-networking meeting are provided instructions to rejoin the tele-networking meeting.

13. The method of claim 11, further comprising receiving a telecommunication indicating the participants in the subconference desire to rejoin the tele-networking meeting.

14. The method of claim 7 further comprising:
sending a first telecommunication indicating that a participant is not needed for a first portion of the tele-networking meeting; and,
sending a second telecommunication indicating that the participant is needed for a second portion of the tele-networking meeting; and,
receiving an acknowledgement telecommunication as a result of sending the first telecommunication.

15. The method of claim 14, wherein the acknowledgement telecommunication indicates a preferred method for the sending of the second telecommunication.

16. The method of claim 7, further comprising;
connecting the participant to the tele-networking meeting in a listen only status;
sending a telecommunication indicating that greater participation is desired; and,
transitioning the participant from a listen-only status to an active status.

17. A device comprising:
a processor; and
a memory coupled to the processor, the memory having stored thereon executable instructions that when executed by the processor cause the processor to effectuate operations comprising:
measuring a talk time of each participant of a tele-networking meeting, wherein the measuring is cumulative over a plurality of tele-networking meetings;
storing the measured talk time of each participant;
comparing the measured talk time of each participant with a target talk time; and,
sending a telecommunication to a participant of the tele-networking meeting based on the comparing of the measured talk time of each participant with the target talk time.

18. The device of claim 17, further operations comprising:
controlling a status of the participants of the tele-networking meeting based on the comparing of the measured talk time of each participant with the target talk time, wherein the status of the participants of the tele-networking meeting is one of active, mute, standby, listen only, subconference, and disconnected.

19. The device of claim 18, wherein the status of the participants of the tele-networking meeting comprises active, mute, standby, listen only, subconference, or disconnected.

20. The device of claim 17, wherein the telecommunication includes one of voice, text, SMS, tone, email or data.

* * * * *